(12) United States Patent
Li et al.

(10) Patent No.: US 11,760,852 B2
(45) Date of Patent: Sep. 19, 2023

(54) PROTEIN/POLYSACCHARIDE/ESSENTIAL OIL NANOMETER EDIBLE FILM AND PREPARATION METHOD THEREFOR

(71) Applicant: HUAIYIN INSTITUTE OF TECHNOLOGY, Huaian (CN)

(72) Inventors: Songlin Li, Huaian (CN); Yongyong Yan, Huaian (CN); Jiayi Cheng, Huaian (CN); Xiaoming Cheng, Huaian (CN); Hua Ye, Huaian (CN); Qingyun Bai, Huaian (CN)

(73) Assignee: HUAIYIN INSTITUTE OF TECHNOLOGY, Huaian (CN)

( * ) Notice: Subject to any disclaimer, the term of this patent is extended or adjusted under 35 U.S.C. 154(b) by 364 days.

(21) Appl. No.: 17/274,534

(22) PCT Filed: Feb. 21, 2019

(86) PCT No.: PCT/CN2019/075632
§ 371 (c)(1),
(2) Date: Mar. 9, 2021

(87) PCT Pub. No.: WO2020/133653
PCT Pub. Date: Jul. 2, 2020

(65) Prior Publication Data
US 2021/0309816 A1    Oct. 7, 2021

(30) Foreign Application Priority Data
Dec. 26, 2018    (CN) .......................... 201811600973.3

(51) Int. Cl.
*C08J 5/18*    (2006.01)
*C08L 5/00*    (2006.01)
(Continued)

(52) U.S. Cl.
CPC ............... *C08J 5/18* (2013.01); *B29C 39/003* (2013.01); *C08L 5/00* (2013.01); *C08L 89/00* (2013.01);
(Continued)

(58) Field of Classification Search
None
See application file for complete search history.

(56) References Cited

FOREIGN PATENT DOCUMENTS

| CN | 101181068 A | 5/2008 |
|----|-------------|--------|
| CN | 101429226 A | 5/2009 |

(Continued)

OTHER PUBLICATIONS

"mainly, adv.". OED Online. Mar. 2023. Oxford University Press. Retrieved from https://www.oed.com on May 2, 2023. (Year: 2023).*

(Continued)

*Primary Examiner* — Richard A Huhn
(74) *Attorney, Agent, or Firm* — HAUPTMAN HAM, LLP

(57) ABSTRACT

A protein/polysaccharide/essential oil nano-edible film. The essential oil nano-edible film includes the following raw materials in parts by weight: 1-8 parts of a quinoa protein-*Atrina pectinata* polysaccharide nanocomposite, 2-11 parts of an *Atrina pectinata* polysaccharide-essential oil nano-composite, 1-12 parts of a quinoa protein, 2-16 parts of *Atrina pectinata* polysaccharide, and 5-53 parts of water. The present invention helps to solve the problem, in a conventional protein film, of the loss of flavor and even toxic side effects caused by the adding of a plasticizer and a crosslinking agent to improve the mechanical strength, the use of a lipid substance that has the capability to easily form a dense molecular network structure to improve the water and gas barrier properties, and the migration of an additive, the plasticizer, or a polymer degradation by-product thereof (Continued)

generated in reaction, and a solvent remaining in the polymerization reaction from the film to food.

7 Claims, 1 Drawing Sheet

(51) Int. Cl.
    *C08L 89/00*     (2006.01)
    *B29C 39/00*     (2006.01)
    *C08K 5/1545*     (2006.01)
    *C08K 5/13*     (2006.01)
    *C08K 5/01*     (2006.01)
    *C08K 5/05*     (2006.01)
    *C08K 5/12*     (2006.01)
    *C08K 5/07*     (2006.01)

(52) U.S. Cl.
CPC ...... *B29K 2005/00* (2013.01); *B29K 2089/00* (2013.01); *C08J 2305/00* (2013.01); *C08J 2389/00* (2013.01); *C08J 2405/00* (2013.01); *C08J 2489/00* (2013.01); *C08K 5/01* (2013.01); *C08K 5/05* (2013.01); *C08K 5/07* (2013.01); *C08K 5/12* (2013.01); *C08K 5/13* (2013.01); *C08K 5/1545* (2013.01); *C08L 2203/16* (2013.01); *C08L 2205/025* (2013.01); *C08L 2205/035* (2013.01)

(56) References Cited

FOREIGN PATENT DOCUMENTS

| | | |
|---|---|---|
| CN | 102924929 A | 2/2013 |
| CN | 103030978 A | 4/2013 |
| CN | 103109916 A | 5/2013 |
| CN | 103588997 A | 2/2014 |
| CN | 103613939 A | 3/2014 |
| CN | 105542195 A | 5/2016 |
| CN | 108578357 A | 9/2018 |
| EP | 0328317 A1 | 8/1989 |

OTHER PUBLICATIONS

First Office Action issued in corresponding Chinese Application No. 201811600973.3; dated Jan. 3, 2020; State Intellectual Property Office of the P.R. China, Beijing, China, 8 pgs.
First Search Report issued in corresponding Chinese Application No. 201811600973.3; dated Dec. 25, 2019; State Intellectual Property Office of the P.R. China, Beijing, China, 2 pgs.
International Search Report issued in corresponding International Application No. PCT/CN2019/075632; dated Sep. 20, 2019; State Intellectual Property Office of the P.R. China, Beijing, China, 7 pgs.
Written Opinion issued in corresponding International Application No. PCT/CN2019/075632; dated Sep. 20, 2019; State Intellectual Property Office of the P.R. China, Beijing, China, 8 pgs.

* cited by examiner

PROTEIN/POLYSACCHARIDE/ESSENTIAL OIL NANOMETER EDIBLE FILM AND PREPARATION METHOD THEREFOR

RELATED APPLICATIONS

The present application is a National Phase of International Application Number PCT/CN2019/075632 filed Feb. 21, 2019 and claims priority to Chinese Application Number 201811600973.3 filed Dec. 26, 2018.

TECHNICAL FIELD

The present invention relates to the technical field of edible films, and in particular, to a protein/polysaccharide/essential oil nano-edible film and a method for preparing same.

BACKGROUND

In recent years, with the improvement of people's quality of life and the enhancement of environmental protection awareness, the environmental pollution problem caused by plastic packaging materials has attracted more and more attention. People urgently need more non-toxic, harmless, degradable and even edible green packaging materials.

An edible film has a broad application prospect in the field of food and drug packaging due to the advantages of unique barrier properties, safety, and no environmental pollution. The edible film is widely used in fields such as the preservation of fruits and vegetables, the processing and preservation of meat and aquatic products, and food packaging.

However, the development of the current edible film is restricted by the relative weak mechanical strength and water vapor barrier effect thereof. In general, a thin film having a porous network structure can be formed by additionally adding a plasticizer and a crosslinking agent in the processing process of the edible film. In general, the plasticizer is polyethylene glycol, glycerin, polypropylene glycol, palmitic acid, stearic acid, etc. A currently used cross-linking agent such as formaldehyde, N-hydroxysuccinimide, glutaraldehyde, epichlorohydrin, citric acid, 1,2,3,4-butanetetracarboxylic acid, polvdialdehyde starch, 1,2-epoxy-3-chloropropane, and ethylene glycol forms a cross-link with protein molecules, which can enhance the mechanical properties of protein films. In addition, in order to improve the water and gas barrier properties, a lipid substance that has the capability to easily form a dense molecular network structure is used. The most commonly used lipids are glyceryl monostearates, glyceryl distearates, and glyceryl tristearates having the number of carbon atoms of 4-18, stearyl alcohol, hydrogenated or non-hydrogenated vegetable oils and waxes (beeswax, candelilla wax, and paraffin), octadecanol, acetylated monoglyceride, stearic acid, and alkanes. However, an additive, a plasticizer, or a polymer degradation by-product thereof generated in reaction, and a solvent remaining in the polymerization reaction will migrate from the film to food, resulting in the loss of flavor and even toxic side effects.

SUMMARY

The technical problem to be solved by the present invention is to provide a protein/polysaccharide/essential oil nano-edible film, and a method for preparing same. The present invention effectively solves the problem, in a conventional protein film, of the loss of flavor and even toxic side effects caused by the adding of a plasticizer and a crosslinking agent to improve the mechanical strength, the use of a lipid substance that has the capability to easily form a dense molecular network structure to improve the water and gas barrier properties, and the migration of the cross-linking agent, the plasticizer, or a polymer degradation by-product thereof generated in reaction, and a solvent remaining in the polymerization reaction from the film to food.

The present invention is achieved through the following technical solution:

a protein/polysaccharide/essential oil nano-edible film, where the protein/polysaccharide/essential oil edible film mainly consists of the following raw materials in parts by weight: 1-8 parts of a quinoa protein-*Atrina pectinata* polysaccharide nanocomposite, 2-11 parts of an *Atrina pectinata* polysaccharide-essential oil nanocomposite, 1-12 parts of a quinoa protein, 2-16 parts of *Atrina pectinata* polysaccharide, and 5-53 parts of water.

The further improved technical solution of the present invention is:

The essential oil is one or more of thymol, citral, geraniol, or Chinese cassia essential oil.

The further improved technical solution of the present invention is:

A method for preparing the protein/polysaccharide/essential oil nano-edible film includes the following steps:

step 1) preparing a quinoa protein solution: dissolving a quinoa protein into deionized water at a mass/volume ratio of 1%-10%, and stirring for 12-24 h at 0-4° C. to form the quinoa protein solution;

step 2) preparing an *Atrina pectinata* polysaccharide solution: dissolving *Atrina pectinata* polysaccharide into deionized water at a mass/volume ratio of 1%-15%, and stirring for 12-24 h at 0-4° C. for full dissolution to form the *Atrina pectinata* polysaccharide solution;

step 3) preparing a quinoa protein-*Atrina pectinata* polysaccharide nanocomposite solution: slowly dripping the *Atrina pectinata* polysaccharide solution into the quinoa protein aqueous solution, enabling the mass ratio of the *Atrina pectinata* polysaccharide to the quinoa protein to be 1:(4-7), regulating the pH of the mixed solution to 9.0-11.0, stirring the mixed solution for 1-4 h at 10-30° C., and then placing same into a water bath at 60-90° C. for heating for 1-3 h to obtain the quinoa protein-*Atrina pectinata* polysaccharide nanocomposite solution;

step 4) preparing an *Atrina pectinata* polysaccharide-essential oil nanocomposite solution: adding an essential oil having a mass fraction of 0.1-15% (based on the mass of the *Atrina pectinata* polysaccharide) to the *Atrina pectinata* polysaccharide solution having a mass fraction of 1-5%, and stirring the mixed solution for 12-24 h at 10-30° C. to obtain the *Atrina pectinata* polysaccharide-essential oil nanocomposite solution:

step 5) preparing a film solution: mixing the prepared quinoa protein solution. *Atrina pectinata* polysaccharide solution, and quinoa protein-*Atrina pectinata* polysaccharide nanocomposite with the *Atrina pectinata* polysaccharide-essential oil nanocomposite at a volume ratio of (100-120):(20-40):(1-4):(1-3), stirring at 50-400 rpm/min for 1-4 hours at 50-90° C.; next, homogenizing the film solution at a rotational speed of 8,000-13,000 rpm/min for 10-30 min. and then standing same in a water bath at 40-50° C. for 1.0-4.0 hours; and step 6) preparing a film: degassing the film solution prepared in step 5) for 0.2-1.2 hours at a vacuum degree of 0.01-0.12 MPa, pouring same onto a flat plate for uniform casting, and drying at 60-80° C. to form a film.

The further improved technical solution of the present invention is:

A method for preparing the quinoa protein includes the following steps:

step 1) mixing quinoa powder with deionized water at a mass/volume ratio of 1:(9-15), and regulating the pH of the mixed solution to 9-11;

step 2) stirring the mixed solution at 200-350 rpm/min for 1-2 h at 0-4° C., centrifuging same at 7,000-12,000 rpm/min for 10-30 min at 0-4° C., removing precipitate, and collecting supernatant; and step 3) performing freeze drying on the supernatant at −20° C. to −40° C. to obtain the quinoa protein.

The further improved technical solution of the present invention is:

A method for preparing the *Atrina pectinata* polysaccharide includes the following steps:

step 1) crushing and homogenizing *Atrina pectinata*, mixing same with anhydrous ethanol at a mass/volume ratio of 1:(5-15), and then stirring the mixed solution at a rotational speed of 100-300 rpm/min for 20-40 min, centrifuging the mixture at 5,000 rpm/min for 20 min, keeping precipitate, drying same at 70-80° C., and pulverizing same to obtain *Atrina pectinata* powder;

step 2) mixing the *Atrina pectinata* powder prepared in step 1) with deionized water at a mass/volume ratio of 1:(3-10), leaching the mixed solution at a rotational speed of 150-350 rpm/min for 30-110 min at 80-93° C., centrifuging an extract solution at 6,000-8,000 rpm/min for 30-40 min, and keeping supernatant; and step 3) mixing the supernatant prepared in step 2) with a Sevage reagent at a ratio of (2-4):1, violently shaking the mixture for 10-20 min, standing same for 20-30 min, centrifuging same at 3,000-4,000 rpm/min for 15-20 min, keeping supernatant, adding ethanol having a mass fraction of 70-80% to the supernatant at a ratio of 1:(5-8), violently shaking the mixture, standing same for 6-10 h at 0-4° C., centrifuging same at 8,000-10,000 rpm/min for 25-35 min, keeping precipitate, and drying same at 70-80° C. to obtain *Atrina pectinata* polysaccharide extract.

The further improved technical solution of the present invention is:

The Sevage reagent is chloroform:1-butanol=5:1 V/V.

The further improved technical solution of the present invention is:

the essential oil is one or more of thymol, citral, geraniol, or Chinese cassia essential oil.

Compared with the prior art, the present invention has the following significant advantages:

I. The quinoa protein-*Atrina pectinata* polysaccharide have opposite charges under the experimental condition, and form an electrostatic complex before the heating process. In order to enhance the interaction between the two, after the mixed solution of the two is heated, the quinoa protein molecules are denatured, exposing a large number of hydrophobic groups, and causing hydrophobic aggregation and disulfide bond exchange between molecules to form a protein aggregate. However, the part of the *Atrina pectinata* polysaccharide molecular chain that has a strong electrostatic attraction with the quinoa protein is fixed in the protein aggregate. With the gradual increase of aggregated quinoa protein molecules, there are more and more fixed *Atrina pectinata* polysaccharide molecular chains. Due to the electrostatic repulsion on the *Atrina pectinata* polysaccharide molecular chains, the further aggregation of the quinoa protein can be prevented to form stable nanoparticles, thereby enhancing the force between molecules. Therefore, the denatured quinoa protein and the fixed part of the *Atrina pectinata* polysaccharide molecular chain together constitute the core of the nanoparticle, and the remaining part of the *Atrina pectinata* polysaccharide molecular chain stretches out of the aggregation network structure of the quinoa protein to form the shell of the nanoparticle. This method overcomes the defect of preparing the nanoparticles by adding a chemical crosslinking agent or an ion.

II. With the gradual increase of the concentration of two composite nanoparticles, the interaction between the quinoa protein and the *Atrina pectinata* polysaccharide molecule is promoted within a certain concentration range. The density of the formed three-dimensional network structure increases, and the rigidity thereof is improved; therefore, the mechanical strength also increases. Nanoscale particles are filled between various molecules, filling some of pores, resulting in the increase in density. It is difficult for water and gas to penetrate, so the water and gas barrier properties are significantly improved.

III. The edible film contains the essential oil, and therefore has the antibacterial performance.

DETAILED DESCRIPTION

Figure 1:
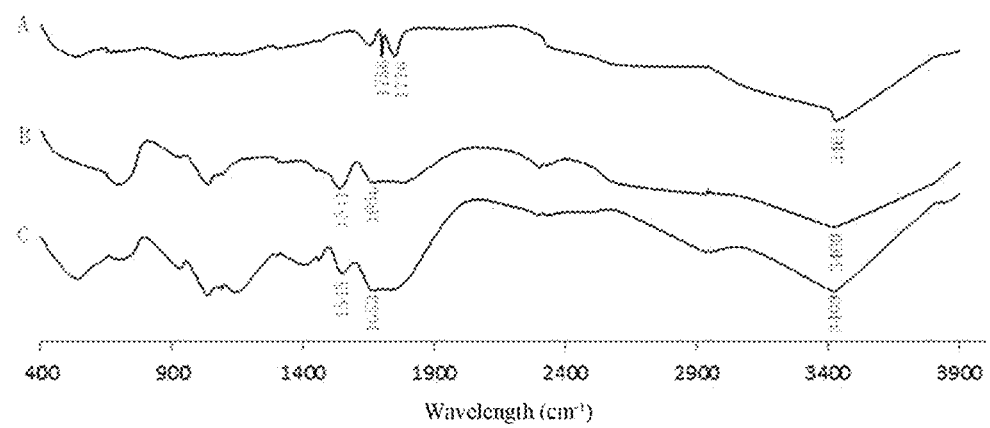
FIG. 1 is an infrared spectrum diagram of a sample in Embodiment I (A: quinoa protein-*Atrina pectinata* polysaccharide nanofilm; B: quinoa protein film; C: *Atrina pectinata* polysaccharide film).

The technical solution of the present invention is described below with reference to Embodiments 1-3, FIGS. 1-3, and Tables 1-3.

The current prior art does not provide the same edible film prepared from raw materials of quinoa protein/*Atrina pectinata* polysaccharide/essential oil; therefore, the edible film prepared from quinoa protein and *Atrina pectinata* polysaccharide in the present invention is used as a control sample in embodiments.

Embodiment I

The preparation steps of a protein/polysaccharide/essential oil nano-edible film are as follows:

1. Preparation of Quinoa Protein:

(1) 90 g of quinoa powder is mixed with 900 mL of deionized water, and the pH of the mixed solution is regulated to 9.5;

(2) the mixed solution is stirred at 210 rpm/min for 1.5 h at 1° C. and centrifuged at 11,500 rpm/min for 13 min at 3° C.; precipitate is removed and supernatant is collected;

(3) freeze drying is performed on the supernatant at −20° C. to obtain the quinoa protein.

2. Preparation of *Atrina Pectinata* Polysaccharide:

(1) 80 g of *Atrina pectinata* is crushed and homogenized, mixed with 500 mL of anhydrous ethanol, and then stirred at a rotational speed of 180 rpm/min for 33 min, the mixture is centrifuged at 5,000 rpm/min for 20 min, and precipitate is kept, dried at 75° C., and then pulverized to obtain *Atrina pectinata* powder;

(2) 22 g of *Atrina pectinata* powder is mixed with 80 mL of deionized water, the mixed solution is leached at a rotational speed of 170 rpm/min for 58 min at 82° C., an extract solution is centrifuged at 6,200 rpm/min for 33 min, and supernatant is kept;

(3) 20 mL of supernatant is mixed with 10 mL of Sevage reagent (chloroform:1-butanol=5:1 V/V), the mixed solution is violently shaken for 16 min, stood for 22 min, and centrifuged at 3,300 rpm/min for 15 min, and supernatant is kept; 10 mL of supernatant is obtained and added to 50 mL of ethanol having a mass fraction of 70%, the mixed solution is violently shaken, stood for 6 h at 0° C., and centrifuged at 8,500 rpm/min for 25 min, and precipitate is kept and dried at 70° C. to obtain *Atrina pectinata* polysaccharide extract.

3. Preparation of Edible Film:

(1) preparing the stirring liquid; 1 g of quinoa protein is dissolved into 100 mL of deionized water, and stirred for 12 h at (TC: 4 g of *Atrina pectinata* polysaccharide is dissolved into 100 mL of deionized water, and stirred for 12 h at 0° C. to be fully dissolved; 40 mL of *Atrina pectinata* polysaccharide solution is slowly dripped into 40 mL of quinoa protein aqueous solution, the pH of the mixed solution is regulated to 9.0, and the mixed solution is stirred for 1 h at 10° C., and then placed into a water bath at 60° C. for heating for 1 h to obtain the quinoa protein-*Atrina pectinata* polysaccharide nanocomposite solution; 0.01 g of thymol is added to 100 mL of *Atrina pectinata* polysaccharide solution having a mass fraction of 1%, and the mixed solution is stirred for 12 h at 10° C. to obtain the *Atrina pectinata* polysaccharide-thymol nanocomposite solution:

(2) preparing the film solution: the prepared 100 mL of quinoa protein solution, 20 mL of *Atrina pectinata* polysaccharide solution, and 1 mL of quinoa protein-*Atrina pectinata* polysaccharide nanocomposite are mixed with 1 mL of *Atrina pectinata* polysaccharide-thymol nanocomposite, the mixture is stirred at 100 rpm/mm for 1 hour at 50° C.; next, the film solution is homogenized at a rotational speed of 8,500 rpm/mm for 10 min, and then stood in a water bath at 40° C. for 1.0 hour;

(3) preparing a film: the film solution is degassed for 0.5 hour at a vacuum degree of 0.01 MPa, poured onto a flat plate for uniform casting, and dried at 60° C. to form a film.

Under the condition of the embodiments, the film is performed infrared spectrum analysis (FIG. 1). The O—H stretching vibration peak is shifted from 3,409 cm$^{-1}$ (*Atrina pectinata* polysaccharide film) and 3,400 cm$^{-1}$ (quinoa protein film) to 3,461 cm$^{-1}$ (quinoa protein-*Atrina pectinata* polysaccharide nanofilm), and the absorption peak thereof becomes higher and narrower, which indicates that the hydrogen bond interaction between molecules is enhanced. The C=O stretching vibration absorption peaks (1,653 cm$^{-1}$ and 1,656 cm$^{-1}$) of the *Atrina pectinata* polysaccharide film and the quinoa protein film are shifted to 1,776 cm$^{-1}$ (quinoa protein-*Atrina pectinata* polysaccharide nanofilm). The C—N stretching and N—H bending absorption peaks of the *Atrina pectinata* polysaccharide and the quinoa protein are shifted from 1,545 cm$^{-1}$ (*Atrina pectinata* polysaccharide film) and 1,541 cm$^{-1}$ (quinoa protein film) to 1,756 cm$^{-1}$ (quinoa protein-*Atrina pectinata* polysaccharide nanofilm), which indicates that an inductive effect occurs between quinoa protein-*Atrina pectinata* polysaccharide nanomolecules to form a hydrogen bond and improve the tensile strength and the elongation at break of the film.

It can be known from Table 1 that the elongation at break, the tensile strength, and the water vapor transmission rate of the protein/polysaccharide/essential oil nano-edible film in the embodiments are significantly better than those of the quinoa protein film and the *Atrina pectinata* polysaccharide nanofilm.

Embodiment II

The preparation steps of a protein/polysaccharide/essential oil nano-edible film are as follows:

1. Preparation of Quinoa Protein:

(1) 150 g of quinoa powder is mixed with 1,500 mL of deionized water, and the pH of the mixed solution is regulated to 10:

(2) the mixed solution is stirred at 250 rpm/min for 1.5 h at 1° C. and centrifuged at 8,200 rpm/min for 16 min at 1° C.; precipitate is removed and supernatant is collected; (3) freeze drying is performed on the supernatant at −28° C. to obtain the quinoa protein.

2. Preparation of *Atrina pectinata* Polysaccharide:

(1) 150 g of *Atrina pectinata* is crushed and homogenized, mixed with 1,500 mL of anhydrous ethanol, and then stirred at a rotational speed of 200 rpm/min for 30 min. the mixture is centrifuged at 5,000 rpm/min for 20 min, and precipitate is kept, dried at 77° C., and then pulverized to obtain *Atrina pectinata* powder:

(2) 30 g of *Atrina pectinata* powder is mixed with 140 mL of deionized water, the mixed solution is leached at a rotational speed of 230 rpm/min for 50 min at 85° C., an extract solution is centrifuged at 7,000 rpm/min for 36 min, and supernatant is kept;

(3) 30 mL of supernatant is mixed with 12 mL of Sevage reagent (chloroform:1-butanol=5:1 V/V), the mixed solution is violently shaken for 18 min, stood for 26 min, and centrifuged at 3,600 rpm/min for 17 min, and supernatant is kept; 10 mL of supernatant is obtained and added to 70 mL of ethanol having a mass fraction of 70%, the mixed solution is violently shaken, stood for 7 h at 2° C. and centrifuged at 8.000 rpm/min for 26 min, and precipitate is kept and dried at 78° C. to obtain *Atrina pectinata* polysaccharide extract.

3. Preparation of Edible Film:

(1) preparing the stirring liquid: 2 g of quinoa protein is dissolved into 100 mL of deionized water, and stirred for 14 h at ° C.; 5 g of *Atrina pectinata* polysaccharide is dissolved into 100 mL of deionized water, and stirred for 14 h at ° C. to be fully dissolved: 40 mL of *Atrina pectinata* polysaccharide solution is slowly dripped into 85 mL of quinoa protein aqueous solution, the pH of the mixed solution is regulated to 10.0, and the mixed solution is stirred for 2 h at 20° C., and then placed into a water bath at 70° C. for heating for 1.5 h to obtain the quinoa protein-*Atrina pectinata* polysaccharide nanocomposite solution; 0.02 g of citral is added to *Atrina pectinata* polysaccharide solution having a mass fraction of 2%, and the mixed solution is stirred for 20 h at 20° C. to obtain the *Atrina pectinata* polysaccharide-citral nanocomposite solution:

(2) preparing the film solution: the prepared 100 mL of quinoa protein solution, 30 mL of *Atrina pectinata* polysaccharide solution, and 2 mL of quinoa protein-*Atrina pectinata* polysaccharide nanocomposite are mixed with 1 mL of *Atrina pectinata* polysaccharide-citral nanocomposite, and the mixture is stirred at 200 rpm/min for 2 hours at 60° C.;

next, the film solution is homogenized at a rotational speed of 10,000 rpm/min for 15 min, and then stood in a water bath at 45° C. for 2.0 hours:

(3) preparing a film: the film solution is degassed for 0.6 hour at a vacuum degree of 0.05 MPa, poured onto a flat plate for uniform casting, and dried at 70° C. to form a film.

Figure 2:
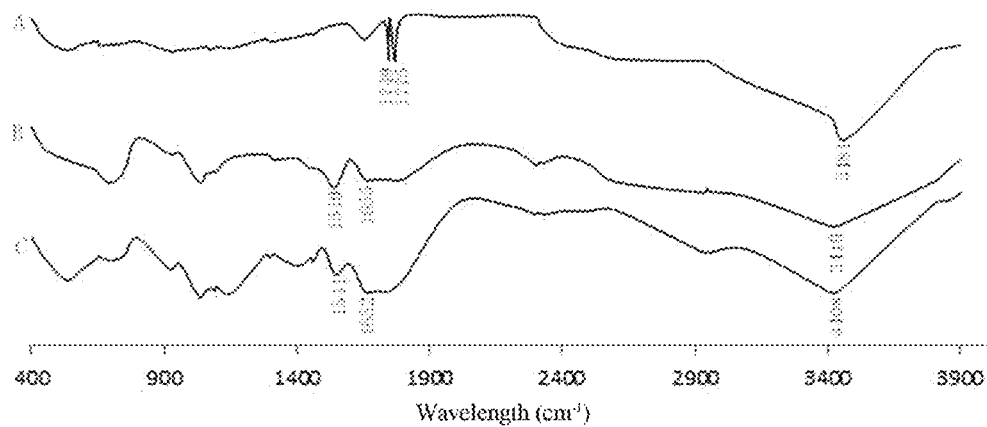
FIG. 2 is an infrared spectrum diagram of a sample in Embodiment II (A: quinoa protein-*Atrina pectinata* polysaccharide nanofilm: B: quinoa protein film: C: *Atrina pectinata* polysaccharide film).

Under the condition of the embodiments, the film is performed infrared spectrum analysis (FIG. 2). The O—H stretching vibration peak is shifted from 3,408 cm$^{-1}$ (*Atrina pectinata* polysaccharide film) and 3,410 cm$^{-1}$ (quinoa protein film) to 3,481 cm$^{-1}$ (quinoa protein-*Atrina pectinata* polysaccharide nanofilm), and the absorption peak thereof becomes higher and narrower, which indicates that the hydrogen bond interaction between molecules is enhanced.

The C=O stretching vibration absorption peaks (1,652 cm$^{-1}$ and 1,655 cm$^{-1}$) of the *Atrina pectinata* polysaccharide film and the quinoa protein film are shifted to 1,775 cm$^{-1}$ (quinoa protein-*Atrina pectinata* polysaccharide nanofilm). The C—N stretching and N—H bending absorption peaks of the *Atrina pectinata* polysaccharide and the quinoa protein are shifted from 1,541 cm$^{-1}$ (*Atrina pectinata* polysaccharide film) and 1,540 cm$^{-1}$ (quinoa protein film) to 1,749 cm$^{-1}$ (quinoa protein-*Atrina pectinata* polysaccharide nanofilm), which indicates that an inductive effect occurs between quinoa protein-*Atrina pectinata* polysaccharide nanomolecules to form a hydrogen bond and improve the tensile strength and the elongation at break of the film.

It can be known from Table 2 that the elongation at break, the tensile strength, and the water vapor transmission rate of the protein/polysaccharide/essential oil nano-edible film in the embodiments are significantly better than those of the quinoa protein film and the *Atrina pectinata* polysaccharide nanofilm.

Embodiment III

The preparation steps of a protein/polysaccharide/essential oil nano-edible film are as follows:

1. Preparation of Quinoa Protein:

(1) 110 g of quinoa powder is mixed with 1,200 mL of deionized water, and the pH of the mixed solution is regulated to 10:

(2) the mixed solution is stirred at 350 rpm/min for 2 h at 4° C. and centrifuged at 12,000 rpm/min for 30 min at 4° C.; precipitate is removed and supernatant is collected;

(3) freeze drying is performed on the supernatant at −40° C. to obtain the quinoa protein.

2. Preparation of *Atrina Pectinata* Polysaccharide:

(1) 110 g of *Atrina pectinata* is crushed and homogenized, mixed with 1,500 mL of anhydrous ethanol, and then stirred at a rotational speed of 300 rpm/min for 40 min, the mixture is centrifuged at 5,000 rpm/min for 20 min, and precipitate is kept, dried at 80'C, and then pulverized to obtain *Atrina pectinata* powder;

(2) 40 g of *Atrina pectinata* powder is mixed with 320 mL of deionized water, the mixed solution is leached at a rotational speed of 300 rpm/min for 90 min at 90° C., an extract solution is centrifuged at 8,000 rpm/min for 40 min, and supernatant is kept;

(3) 40 mL of supernatant is mixed with 10 mL of Sevage reagent (chloroform:1-butanol=5:1 V/V), the mixed solution is violently shaken for 20 min, stood for 30 min, and centrifuged at 3,800 rpm/min for 18 min, and supernatant is kept; 10 mL of supernatant is obtained and added to 60 mL of ethanol having a mass fraction of 70%, the mixed solution is violently shaken, stood for 9 h at 2° C., and centrifuged at 9,200 rpm/min for 26 min, and precipitate is kept and dried at 78° C. to obtain *Atrina pectinata* polysaccharide extract.

3. Preparation of Edible Film:

(1) preparing the stirring liquid: 5 g of quinoa protein is dissolved into 100 mL of deionized water, and stirred for 18 h at 3° C.; 2 g of *Atrina pectinata* polysaccharide is dissolved into 100 mL of deionized water, and stirred for 24 h at 2° C. to be fully dissolved; 40 mL of *Atrina pectinata* polysaccharide solution is slowly dripped into 80 mL of quinoa protein aqueous solution, the pH of the mixed solution is regulated to 10.0, and the mixed solution is stirred for 4 h at 30° C. and then placed into a water bath at 80° C. for heating for 2 h to obtain the quinoa protein-*Atrina pectinata* polysaccharide nanocomposite solution: 0.03 g of geraniol is added to 100 mL of *Atrina pectinata* polysaccharide solution having a mass fraction of 3%, and the mixed solution is stirred for 20 h at 30° C. to obtain the *Atrina pectinata* polysaccharide-geraniol nanocomposite solution;

(2) preparing the film solution: the prepared 100 mL of quinoa protein solution, 40 mL of *Atrina pectinata* polysaccharide solution, and 3 mL of quinoa protein-*Atrina pectinata* polysaccharide nanocomposite are mixed with 2 mL of *Atrina pectinata* polysaccharide-geraniol nanocomposite, and the mixed solution is stirred at 300 rpm/min for 3 hours at 80° C.; next, the film solution is homogenized at a rotational speed of 11,000 rpm/min for 25 min, and then stood in a water bath at 40° C. for 3.0 hours;

(3) preparing a film: the film solution is degassed for 0.9 hour at a vacuum degree of 0.07 MPa, poured onto a flat plate for uniform casting, and dried at 80° C. to form a film.

Figure 3:
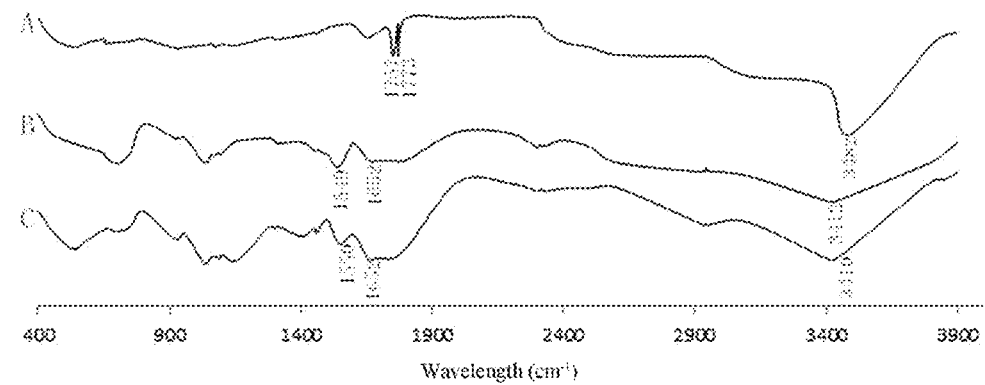
FIG. 3 is an infrared spectrum diagram of a sample in Embodiment III (A: quinoa protein-*Atrina pectinata* polysaccharide nanofilm; B: quinoa protein film; C: *Atrina pectinata* polysaccharide film).

Under the condition of the embodiments, the film is performed infrared spectrum analysis (FIG. 3). The O—H stretching vibration peak is shifted from 3,410 cm$^{-1}$ (*Atrina pectinata* polysaccharide film) and 3,412 cm$^{-1}$ (quinoa protein film) to 3,482 cm$^{-1}$ (quinoa protein-*Atrina pectinata* polysaccharide nanofilm), and the absorption peak thereof becomes higher and narrower, which indicates that the hydrogen bond interaction between molecules is enhanced. The C=O stretching vibration absorption peaks (1,652 cm$^{-1}$ and 1,652 cm$^{-1}$) of the *Atrina pectinata* polysaccharide film and the quinoa protein film are shifted to 1,773 cm$^{-1}$ (quinoa protein-*Atrina pectinata* polysaccharide nanofilm). The C—N stretching and N—H bending absorption peaks of the *Atrina pectinata* polysaccharide and the quinoa protein are shifted from 1,550 cm$^{-1}$ (*Atrina pectinata* polysaccharide film) and 1,549 cm$^{-1}$ (quinoa protein film) to 1,757 cm$^{-1}$ (quinoa protein-*Atrina pectinata* polysaccharide nanofilm), which indicates that an inductive effect occurs between quinoa protein-*Atrina pectinata* polysaccharide nanomolecules to form a hydrogen bond and improve the tensile strength and the elongation at break of the film.

It can be known from Table 3 that the elongation at break, the tensile strength, and the water vapor transmission rate of the protein/polysaccharide/essential oil nano-edible film in the embodiments are significantly better than those of the quinoa protein film and the *Atrina pectinata* polysaccharide nanofilm.

TABLE 1

| | Elongation at break (%) | | |
| --- | --- | --- | --- |
| Film | Embodiment I | Embodiment II | Embodiment III |
| A | 50.26 ± 1.33b | 51.22 ± 0.93b | 52.58 ± 2.59b |
| B | 25.11 ± 4.36a | 24.31 ± 2.12a | 25.39 ± 1.39a |
| C | 25.28 ± 1.35a | 24.91 ± 0.59a | 26.33 ± 1.22a |

TABLE 2

| | Tensile strength (N/mm$^2$) | | |
| --- | --- | --- | --- |
| Film | Embodiment I | Embodiment II | Embodiment III |
| A | 11.23 ± 0.67b | 12.38 ± 2.05b | 11.68 ± 1.22b |
| B | 5.2 ± 0.41a | 5.32 ± 0.93a | 5.37 ± 1.39a |
| C | 5.3 ± 0.31a | 5.43 ± 1.29a | 5.59 ± 1.03a |

TABLE 3

| | Water vapor transmission rate (g · mm · Pa$^{-1}$day$^{-1}$m$^2$) | | |
| --- | --- | --- | --- |
| Film | Embodiment I | Embodiment II | Embodiment III |
| A | 0.09 ± 0.012a | 0.08 ± 0.01a | 0.07 ± 0.02a |
| B | 0.35 ± 0.051c | 0.37 ± 0.029c | 0.33 ± 0.11c |
| C | 0.27 ± 0.013b | 0.29 ± 0.101b | 0.22 ± 0.091b |

Note: the same column data marked by different letters indicates the significant difference (the significant level p<0.05).

A: protein/polysaccharide/essential oil nano-edible film; B: quinoa protein film; C: *Atrina pectinata* polysaccharide film Embodiment I: the composition of the protein/polysaccharide/essential oil nano-edible film: 1 g of quinoa protein and 0.8 g of *Atrina pectinata* polysaccharide; quinoa protein-*Atrina pectinata* polysaccharide nanocomposite: 0.04 g of *Atrina pectinata* polysaccharide+0.01 g of quinoa protein; *Atrina pectinata* polysaccharide-essential oil composite: 0.01 g of *Atrina pectinata* polysaccharide+0.0001 g of thymol; and 120 mL of deionized water: the composition of the quinoa protein film: 1.8 g of quinoa protein and 180 mL of deionized water; the composition of the *Atrina pectinata* polysaccharide film: 1.8 g of *Atrina pectinata* polysaccharide and 180 mL of deionized water.

Embodiment II: the composition of the protein/polysaccharide/essential oil nano-edible film: 1 g of quinoa protein and 1.2 g of *Atrina pectinata* polysaccharide; quinoa protein-*Atrina pectinata* polysaccharide nanocomposite: 0.08 g of *Atrina pectinata* polysaccharide+0.02 g of quinoa protein; *Atrina pectinata* polysaccharide-essential oil composite: 0.01 g of *Atrina pectinata* polysaccharide+0.0001 g of citral; and 120 mL of deionized water; the composition of the quinoa protein film: 1.8 g of quinoa protein and 180 mL of deionized water; the composition of the *Atrina pectinata* polysaccharide film: 1.8 g of *Atrina pectinata* polysaccharide and 180 mL of deionized water.

Embodiment III: the composition of the protein/polysaccharide/essential oil nano-edible film: 1 g of quinoa protein and 1.6 g of *Atrina pectinata* polysaccharide; quinoa protein-*Atrina pectinata* polysaccharide nanocomposite: 0.12 g of *Atrina pectinata* polysaccharide+0.03 g of quinoa protein; *Atrina pectinata* polysaccharide-essential oil composite: 0.02 g of *Atrina pectinata* polysaccharide+0.0002 g of geraniol; and 120 mL of deionized water; the composition of the quinoa protein film: 1.8 g of quinoa protein and 180 mL of deionized water; the composition of the *Atrina pectinata* polysaccharide film: 1.8 g of *Atrina pectinata* polysaccharide and 180 mL of deionized water.

The technical means disclosed in the solution of the present invention are not limited to the technical means disclosed in the embodiments, and further include the technical solutions constituted by any combination of the technical features. It should be noted that many improvements and modifications can be made by persons of ordinary skills in the art without departing from the principle of the present invention, and those improvements and modifications should also be regarded as falling within the scope of protection of the present invention.

The invention claimed is:

1. A protein/polysaccharide/essential oil nano-edible film, wherein the protein/polysaccharide/essential oil edible film mainly consists of the following raw materials in parts by weight: 1-8 parts of a quinoa protein-*Atrina pectinata* polysaccharide nanocomposite, 2-11 parts of an *Atrina pectinata* polysaccharide-essential oil nanocomposite, 1-12 parts of a quinoa protein, 2-16 parts of *Atrina pectinata* polysaccharide, and 5-53 parts of water.

2. The protein/polysaccharide/essential oil nano-edible film according to claim 1, wherein the essential oil is one or more of thymol, citral, geraniol, or Chinese cassia essential oil.

3. A method for preparing the protein/polysaccharide/essential oil nano-edible film according to claim 1, comprising the following steps:
   step 1) preparing a quinoa protein solution: dissolving a quinoa protein into deionized water at a mass/volume ratio of 1%-10%, and stirring for 12-24 h at 0-4° C. to form the quinoa protein solution;
   step 2) preparing an *Atrina pectinata* polysaccharide solution: dissolving *Atrina pectinata* polysaccharide into deionized water at a mass/volume ratio of 1%-15%, and stirring for 12-24 h at 0-4° C. for full dissolution to form the *Atrina pectinata* polysaccharide solution;
   step 3) preparing a quinoa protein-*Atrina pectinata* polysaccharide nanocomposite solution: slowly dripping the *Atrina pectinata* polysaccharide solution into the quinoa protein aqueous solution, enabling the mass ratio of the *Atrina pectinata* polysaccharide to the quinoa protein to be 1:(4-7), regulating the pH of the mixed solution to 9.0-11.0, stirring the mixed solution for 1-4 h at 10-30° C., and then placing same into a water bath at 60-90° C. for heating for 1-3 h to obtain the quinoa protein-*Atrina pectinata* polysaccharide nanocomposite solution;
   step 4) preparing an *Atrina pectinata* polysaccharide-essential oil nanocomposite solution: adding an essential oil having a mass fraction of 0.1-15% (based on the mass of the *Atrina pectinata* polysaccharide) to the *Atrina pectinata* polysaccharide solution having a mass fraction of 1-5%, and stirring the mixed solution for 12-24 h at 10-30° C. to obtain the *Atrina pectinata* polysaccharide-essential oil nanocomposite solution;
   step 5) preparing a film solution: mixing the prepared quinoa protein solution, *Atrina pectinata* polysaccharide solution, and quinoa protein-*Atrina pectinata* polysaccharide nanocomposite with the *Atrina pectinata* polysaccharide-essential oil nanocomposite at a volume ratio of (100-120):(20-40):(1-4):(1-3), stirring at 50-400 rpm/min for 1-4 hours at 50-90° C.; next, homogenizing the film solution at a rotational speed of 8,000-13,000 rpm/min for 10-30 min, and then standing same in a water bath at 40-50° C. for 1.0-4.0 hours; and step 6) preparing a film: degassing the film solution prepared in step 5) for 0.2-1.2 hours at a vacuum degree of 0.01-0.12 MPa, pouring same onto a flat plate for uniform casting, and drying at 60-80° C. to form a film.

4. The method for preparing the protein/polysaccharide/essential oil nano-edible film according to claim 3, wherein a method for preparing the quinoa protein comprises the following steps:

step 1) mixing quinoa powder with deionized water at a mass/volume ratio of 1:(9-15), and regulating the pH of the mixed solution to 9-11;

step 2) stirring the mixed solution at 200-350 rpm/min for 1-2 h at 0-4° C., centrifuging same at 7,000-12,000 rpm/min for 10-30 min at 0-4° C., removing precipitate, and collecting supernatant; and step 3) performing freeze drying on the supernatant at −20° C. to −40° C. to obtain the quinoa protein.

5. The method for preparing the protein/polysaccharide/essential oil nano-edible film according to claim 3, wherein a method for preparing the *Atrina pectinata* polysaccharide comprises the following steps:

step 1) crushing and homogenizing *Atrina pectinata*, mixing same with anhydrous ethanol at a mass/volume ratio of 1:(5-15), and then stirring the mixed solution at a rotational speed of 100-300 rpm/min for 20-40 min, centrifuging the mixture at 5,000 rpm/min for 20 min, keeping precipitate, drying same at 70-80° C., and pulverizing same to obtain *Atrina pectinata* powder;

step 2) mixing the *Atrina pectinata* powder prepared in step 1) with deionized water at a mass/volume ratio of 1:(3-10), leaching the mixed solution at a rotational speed of 150-350 rpm/min for 30-110 min at 80-93° C., centrifuging an extract solution at 6,000-8,000 rpm/min for 30-40 min, and keeping supernatant; and step 3) mixing the supernatant prepared in step 2) with a Sevage reagent at a ratio of (2-4):1, violently shaking the mixture for 10-20 min, standing same for 20-30 min, centrifuging same at 3,000-4,000 rpm/min for 15-20 min, keeping supernatant, adding ethanol having a mass fraction of 70-80% to the supernatant at a ratio of 1:(5-8), violently shaking the mixture, standing same for 6-10 h at 04° C., centrifuging same at 8,000-10,000 rpm/min for 25-35 min, keeping precipitate, and drying same at 70-80° C. to obtain *Atrina pectinata* polysaccharide extract.

6. The method for preparing the protein/polysaccharide/essential oil nano-edible film according to claim 5, wherein the Sevage reagent is chloroform:1-butanol=5:1 VN.

7. The method for preparing the protein/polysaccharide/essential oil nano-edible film according to claim 3, wherein the essential oil is one or more of thymol, citral, geraniol, or Chinese cassia essential oil.

\* \* \* \* \*